(12) United States Patent
Curry et al.

(10) Patent No.: US 10,614,413 B2
(45) Date of Patent: Apr. 7, 2020

(54) INVENTORY MANAGEMENT SYSTEM AND METHOD OF USE

(71) Applicant: LIFE TECHNOLOGIES CORPORATION, Carlsbad, CA (US)

(72) Inventors: Justin Curry, Vista, CA (US); Darren Thierry, Carlsbad, CA (US); Michael Dennis Callahan, San Diego, CA (US); Mark Cunningham, Erskine (GB); Richard Waight, Harpenden (GB)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 15 days.

(21) Appl. No.: 15/519,928

(22) PCT Filed: Oct. 23, 2015

(86) PCT No.: PCT/US2015/057192
§ 371 (c)(1),
(2) Date: Apr. 18, 2017

(87) PCT Pub. No.: WO2016/065304
PCT Pub. Date: Apr. 28, 2016

(65) Prior Publication Data
US 2017/0337507 A1 Nov. 23, 2017

Related U.S. Application Data

(60) Provisional application No. 62/068,506, filed on Oct. 24, 2014.

(51) Int. Cl.
*G06Q 10/08* (2012.01)
*G07F 17/14* (2006.01)
(Continued)

(52) U.S. Cl.
CPC ......... *G06Q 10/087* (2013.01); *G06K 7/1413* (2013.01); *G07C 9/00182* (2013.01); *G07F 17/14* (2013.01)

(58) Field of Classification Search
CPC . G06Q 20/18; G06Q 30/0237; G06Q 10/0836
See application file for complete search history.

(56) References Cited

U.S. PATENT DOCUMENTS 4,866,661 A * 9/1989 de Prins ............... G06Q 20/342
235/382
5,886,634 A 3/1999 Muhme
(Continued)

FOREIGN PATENT DOCUMENTS

DE 101 64 574 4/2004
DE 102010063477 6/2012
(Continued)

OTHER PUBLICATIONS

EP15852155.9, Extended European Search Report dated Feb. 12, 2018, 9 Pages.
(Continued)

*Primary Examiner* — Paul Danneman
(74) *Attorney, Agent, or Firm* — Workman Nydegger

(57) ABSTRACT

Provided is a computer-implemented method for product management The method can include obtaining user Identification information from a user, wherein the identification code is associated with a financial account, of the user; validating, by a processor, that the identification information is authentic based on registration information that was previously received; providing first access signal to a locking mechanism of a locking enclosure to unlock the locking mechanism based on the validating, wherein the locking enclosure securely stores a purchasable product; obtaining product identification information from a scan of a bar code associated with the product providing the product informa-
(Continued)

tion that was obtained to be rendered on a display; receiving an indication from the user that the product information is correct; and providing a second access signal to the locking mechanism to lock the locking mechanism based on the indication that was received.

19 Claims, 10 Drawing Sheets

(51) Int. Cl.
*G06K 7/14* (2006.01)
*G07C 9/00* (2020.01)

(56) References Cited

U.S. PATENT DOCUMENTS

| | | |
|---|---|---|
| 6,102,162 A | 8/2000 | Teicher |
| 6,116,461 A | 9/2000 | Broadfield et al. |
| 6,195,005 B1 | 2/2001 | Maloney |
| 6,204,763 B1 | 3/2001 | Sone |
| 6,314,406 B1* | 11/2001 | O'Hagan ............ G06K 7/0004 705/14.23 |
| 6,318,138 B1 | 11/2001 | Mathews et al. |
| 6,323,782 B1 | 11/2001 | Stephens et al. |
| 6,327,576 B1 | 12/2001 | Ogasawara |
| 6,366,205 B1 | 4/2002 | Sutphen |
| 6,609,969 B1 | 8/2003 | Luciano et al. |
| 6,677,857 B2 | 1/2004 | Bara et al. |
| 6,690,997 B2* | 2/2004 | Rivalto ................. G06Q 10/08 700/237 |
| 6,724,308 B2 | 4/2004 | Nicholson |
| 6,866,195 B2 | 3/2005 | Knowles et al. |
| 6,879,243 B1 | 4/2005 | Booth et al. |
| 6,909,356 B2 | 6/2005 | Brown et al. |
| 6,989,741 B2 | 1/2006 | Kenny et al. |
| 7,015,811 B2 | 3/2006 | Decker et al. |
| 7,050,991 B2 | 5/2006 | Ogasawara |
| 7,088,248 B2 | 8/2006 | Forster |
| 7,119,692 B2 | 10/2006 | Lieffort et al. |
| 7,119,738 B2 | 10/2006 | Bridgelall et al. |
| 7,258,276 B2 | 8/2007 | Linton et al. |
| 7,293,705 B2 | 11/2007 | Linton et al. |
| 7,342,497 B2 | 3/2008 | Chung et al. |
| 7,348,884 B2 | 3/2008 | Higham |
| 7,474,217 B2 | 1/2009 | Himberger et al. |
| 7,474,281 B2 | 1/2009 | Lin et al. |
| 7,504,949 B1 | 3/2009 | Rouaix et al. |
| 7,596,427 B1 | 9/2009 | Frederick et al. |
| 7,661,591 B2 | 2/2010 | Dearing et al. |
| 7,675,421 B2 | 3/2010 | Higham |
| 7,696,874 B2 | 4/2010 | Stevens |
| 7,710,275 B2 | 5/2010 | Phillips et al. |
| 7,719,423 B2 | 5/2010 | Himberger et al. |
| 7,735,732 B2 | 6/2010 | Linton et al. |
| 7,783,379 B2* | 8/2010 | Beane .................... G06Q 20/12 700/236 |
| 7,791,479 B2 | 9/2010 | Dearing et al. |
| 7,812,719 B2 | 10/2010 | Djuric et al. |
| 7,881,822 B2* | 2/2011 | Thornton ................. G07F 5/18 700/236 |
| 7,911,346 B1 | 3/2011 | Claudatos et al. |
| 7,938,326 B2 | 5/2011 | Dearing et al. |
| 7,942,321 B2 | 5/2011 | Linton et al. |
| 7,967,199 B2 | 6/2011 | Linton et al. |
| 8,025,228 B2 | 9/2011 | Dearing et al. |
| 8,031,072 B2 | 10/2011 | Phillips et al. |
| 8,085,150 B2 | 12/2011 | Oberle et al. |
| 8,102,264 B2 | 1/2012 | Rinkes et al. |
| 8,102,265 B1 | 1/2012 | Billman |
| 8,106,776 B2 | 1/2012 | Bauchot et al. |
| 8,106,778 B2 | 1/2012 | Killian et al. |
| 8,113,425 B2 | 2/2012 | Dearing et al. |
| 8,120,486 B2 | 2/2012 | Rinkes |
| 8,120,494 B1 | 2/2012 | Aiouaz et al. |
| 8,145,351 B2* | 3/2012 | Schininger ................ E05G 1/06 221/12 |
| 8,164,419 B2* | 4/2012 | Fisher .................. E05B 19/0005 340/5.73 |
| 8,231,053 B2 | 7/2012 | Linton et al. |
| 8,258,961 B2 | 9/2012 | Phillips et al. |
| 8,490,871 B1* | 7/2013 | Miller ..................... G07F 17/18 235/375 |
| 8,825,531 B1* | 9/2014 | Catoe ................... G07G 1/0036 235/383 |
| 9,317,832 B2* | 4/2016 | Gibson, Jr. ............. G07F 17/12 |
| 9,542,664 B2* | 1/2017 | Henry |
| 9,589,433 B1* | 3/2017 | Thramann ........ G08B 13/19613 |
| 9,963,912 B2* | 5/2018 | Carr .................. G07C 9/00896 |
| 2001/0042024 A1 | 11/2001 | Rogers |
| 2001/0054952 A1 | 12/2001 | Desai et al. |
| 2002/0035515 A1 | 3/2002 | Moreno |
| 2002/0077937 A1* | 6/2002 | Lyons ................... G06Q 10/087 705/28 |
| 2002/0080030 A1* | 6/2002 | Inomata .................. G07F 17/12 340/542 |
| 2002/0169628 A1* | 11/2002 | Bauer ..................... G06Q 10/08 705/26.1 |
| 2003/0158624 A1* | 8/2003 | Kimura .................. G06Q 10/02 700/233 |
| 2006/0116899 A1 | 6/2006 | Lax et al. |
| 2008/0115543 A1 | 5/2008 | Lanigan et al. |
| 2009/0132090 A1 | 5/2009 | Kaczmarz et al. |
| 2011/0074543 A1 | 3/2011 | Kaczmarz et al. |
| 2011/0080252 A1 | 4/2011 | Ibsies |
| 2012/0086314 A1* | 4/2012 | Bourke ................... G07F 17/10 312/109 |
| 2012/0200213 A1 | 8/2012 | Savage et al. |
| 2012/0310410 A1* | 12/2012 | Adams ..................... E05G 1/04 700/237 |
| 2013/0144428 A1* | 6/2013 | Irwin ....................... G05D 3/00 700/218 |
| 2013/0169815 A1* | 7/2013 | Carney ................ H04L 63/0853 348/156 |
| 2013/0253700 A1 | 9/2013 | Carson et al. |
| 2013/0320820 A1 | 12/2013 | Rahilly |
| 2013/0338822 A1* | 12/2013 | Gibson, Jr. ........ G06Q 10/0836 700/237 |
| 2014/0114875 A1* | 4/2014 | Murthy ............... G07C 9/00166 705/339 |
| 2014/0316875 A1* | 10/2014 | Tkachenko ........... G07F 11/002 705/14.25 |
| 2014/0316916 A1 | 10/2014 | Hay |
| 2015/0012396 A1* | 1/2015 | Puerini ............... G06Q 10/0875 705/28 |
| 2015/0356664 A1* | 12/2015 | Mackler ............. G06Q 30/0635 705/26.81 |
| 2017/0221030 A1* | 8/2017 | Clark ................. G06K 7/10722 |

FOREIGN PATENT DOCUMENTS

| | | |
|---|---|---|
| EP | 1485775 | 12/2004 |
| EP | 1840854 | 10/2007 |
| GB | 2 429 987 | 3/2007 |
| KR | 10-1319373 | 10/2013 |
| WO | WO-05/47695 | 5/2005 |
| WO | WO-2006/116112 | 11/2006 |
| WO | WO-2014/092754 | 6/2014 |
| WO | WO-2014/168955 | 10/2014 |

OTHER PUBLICATIONS

PCT/US2015/057192, "International Search Report", dated Feb. 16, 2016, 4 Pages.

* cited by examiner

SC EXPRESS (LOCK)

1. SCAN BADGE   2. CONFIRM PAYMENT, UNIT UNLOCKS   3. SCAN PRODUCT   4. SUBMIT ORDER 505    510    515    520

SC EXPRESS B2B

1. PLACE ORDER ONLINE   2. SCAN BADGE   3. SCAN ORDER CONFIRMATION   4. UNIT UNLOCKS   5. TAKE YOUR PRODUCTS 525    530    535    540    545

US 10,614,413 B2

INVENTORY MANAGEMENT SYSTEM AND METHOD OF USE

CROSS-REFERENCE TO RELATED APPLICATIONS

This application claims benefit of priority to U.S. Provisional Patent Application No. 62/068,506 filed on Oct. 24, 2014 the entirety of which is hereby incorporated by reference herein.

FIELD

The present disclosure is generally related inventory management, and more particularly is related to inventory management using a secured enclosure.

BACKGROUND

Currently, radio frequency identification (RFID) technology is widely used for tracking products and for monitoring useful information regarding products. For example, information regarding products can be gathered from storage facilities, including restocking needs, inventory, tracking of products, or determining when reordering products is needed. Accurate inventory visibility is critical to optimizing business management processes and reducing unnecessary losses stemming from poor customer service and product availability. RFID is potentially the most powerful technology for managing inventory because of its ability to reduce the time it takes to perform inventory, thereby providing enterprises with real time visibility into the products on the shelves. In some cases, inventory tracking is accomplished using enclosures or otherwise protected areas enabled with RFID technology. These kinds of improvements in inventory time, allow RFID users to take immediate advantage to the inventory data and make real-time decisions on stock availability. Data gathered through real-time inventory is used not only to improve the customer experience and increase sales, but also to streamline operations and reduce overall costs. It would be advantageous to provide alternate systems and methods for such inventory management.

Thus, a heretofore unaddressed need exists in the industry to address the aforementioned deficiencies and inadequacies.

SUMMARY

According to the present teachings, a computer-implemented method for product management is disclosed. The method can comprise obtaining user identification information from a user, wherein the identification information is associated with a financial account of the user; validating, by a processor, that the identification information is authentic based on registration information that was previously received; providing a first access signal to a locking mechanism of a locking enclosure to unlock the locking mechanism based on the validating, wherein the locking enclosure securely stores a purchasable product; obtaining product identification information from a scan of a bar code or by RFID associated with the product; providing the product information that was obtained to be rendered on a display; receiving an indication from the user that the product information is correct; and providing a second access signal to the locking mechanism to lock the locking mechanism based on the indication that was received.

The method can further comprise obtaining order information for a user, wherein the order information comprises one or more of: information related to the user, information related to one or products that the user wishes to purchase in an order. The obtaining user identification information from the user can comprise scanning a badge comprising a barcode that has been registered with the user or obtaining the user identification information using RFID. The barcode can be a 1-dimensional barcode or a 2-dimensional barcode. The obtaining product identification information from the scan of the bar code associated with the product can comprise scanning the barcode with a barcode reader.

The method can further comprise collecting the product information once the product information has been identified as being correct. The product information can be collected using RFID. The method can further comprise providing the product information that was collected to an inventory and/or fulfillment system to be used for product analysis and/or resupply for the locking enclosure.

According to the present teachings, a computer-implemented method for product management is disclosed. The method can comprise obtaining order information for a user, wherein the order information comprises one or more of: information related to the user, information related to one or products that the user wishes to purchase in an order; obtaining user identification information from the user, wherein the identification code is associated with a financial account of the user; obtaining order confirmation information from a scan of a bar code or RFID associated with the order confirmation; providing a first access signal to a locking mechanism of a locking enclosure to unlock the locking mechanism based on the order confirmation information that was obtained; and providing a order completion indication subsequent to the first access signal indicating that the order is complete.

The method can further comprise validating, by a processor, that the user identification information is authentic based on registration information that was previously received. The method can further comprise obtaining product identification information from a scan of a bar code associated with the product or through RFID. The method can further comprise providing the product information that was obtained to be rendered on a display. The method can further comprise receiving an indication from the user that the product information is correct. The method can further comprise providing a second access signal to the locking mechanism to lock the locking mechanism based on the indication that was received.

According to the present teachings, a device is disclosed that can comprise at least one processor; a memory containing instructions for execution by the at least one processor, such that the instructions cause the processor to perform the method for product management. The method can comprise obtaining user identification information from a user, wherein the identification code is associated with a financial account of the user; validating, by a processor, that the identification information is authentic based on registration information that was previously received; providing a first access signal to a locking mechanism of a locking enclosure to unlock the locking mechanism based on the validating, wherein the locking enclosure securely stores a purchasable product; obtaining product identification information from a scan of a bar code associated with the product or through RFID; providing the product information that was obtained to be rendered on a display; receiving an indication from the user that the product information is correct; and providing a second access signal to the locking mechanism to lock the locking mechanism based on the indication that was received.

The processor can be further operable to perform the method comprising obtaining order information for a user, wherein the order information comprises one or more of: information related to the user, information related to one or products that the user wishes to purchase in an order. The obtaining user identification information from the user can comprise scanning a badge comprising a barcode that has been registered with the user or through RFID. The obtaining product identification information from the scan of the bar code associated with the product can comprise scanning the barcode with a barcode reader. The processor can be further operable to perform the method comprising collecting the product information once the product information has been identified as being correct. The processor can be further operable to perform the method comprising providing the product information that was collected to an inventory and/or fulfillment system to be used for product analysis and/or resupply for the locking enclosure.

Additional objects and advantages of the disclosure will be set forth in part in the description which follows, and in part will be obvious from the description, or can be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate the present disclosure and together with the description, serve to explain the principles of the present disclosure.

DESCRIPTION

Reference will now be made in detail to exemplary implementations of the present disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations in which the present disclosure can be practiced. These implementations are described in sufficient detail to enable those skilled in the art to practice the present disclosure and it is to be understood that other implementations can be utilized and that changes can be made without departing from the scope of the present disclosure. The following description is, therefore, merely exemplary.

Figure 1:
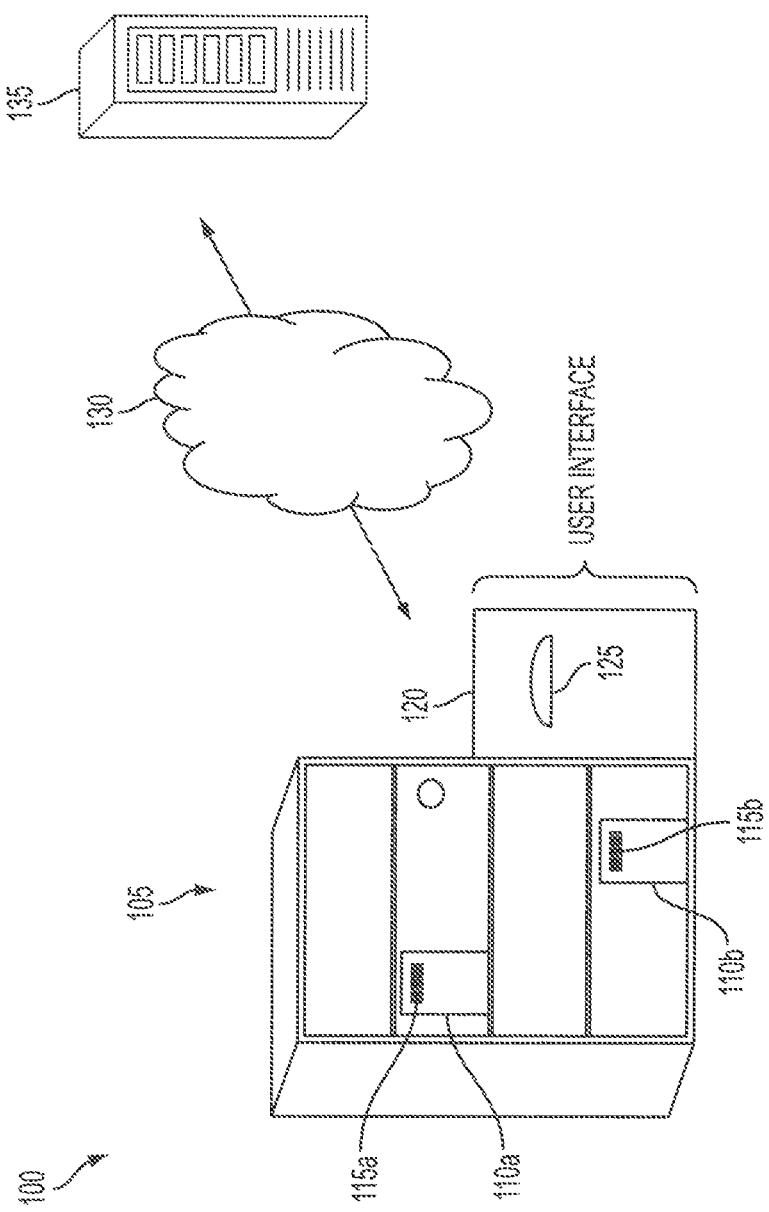
FIG. 1 illustrates an example system configuration of the kiosk, according the present teachings.

In accordance with the present teachings, a kiosk or vending machine-like device and a method of using the same are disclosed herein. FIG. 1 shows an example configuration 100 of kiosk 105 that can be configured as a lockable enclosure, discussed further below, that stores items 110a and 110b that are purchasable using the techniques described herein. Items 110a and 110b can include an associated identification tag 115a and 115b, respectively, such as a barcode or a radio-frequency ("RF") tag, also called RFID or RFID tag. User-interface 120 can be integral or coupled with kiosk 105 to provide a mechanism in which a user can interact with kiosk 105. User-interface 120 can include a display (not shown) and an identification tag reader 125, such as a barcode reader. Items 110a and/or 110b can be removed from kiosk 105 and scanned with an identification tag reader 125 or tracked using RFID during the purchase process. The display on user-interface 120 can display information related to the items being scanned or tracked so that the user can have a visual confirmation that the items were scanned correctly. Kiosk 105 can communicate with an offsite component 135 through network 130 that can facilitate functions, such as, order processing, inventory management, maintenance, or similar type operations.

Kiosk 105 can be configured to provide information, such as advertisements and promotions, on screen as well as to users that travel within a given proximity through their mobile devices, such as smart phones or mobile computers. The information can be provided by periodically pushing the information using internet communication protocols that are known in the art. Additionally or alternatively, users can subscribe to receive updates from kiosk 105.

Kiosk 105 can be configured as an enclosure with one or more self-locking doors. The one or more self-locking doors can be on an enclosure or on a side wall of an area. The one or more self-locking doors can include one or more locks. For example, kiosk 105 can include one or more separate self-locking doors with each self-locking door having its own lock. Each self-locking door can secure one or more items, such as items 110a or 110b, using its own lock. In some examples, the locks can be retrofitted into existing doors or kiosk 105. The locks can be controlled by a common power source or hub that can be in electrical communication with kiosk 105 and/or any peripheral structures coupled to kiosk 105, such as display 120. In some examples, one or more of the locks can be unlocked for the same time and for a pre-determined amount of time that can be specified by a control system and/or an authorized administrative entity. In some examples, each lock can be unlocked individually or in selective sub-groups of the total locks for a particular kiosk 105. Each lock can also be configured to have a manual override capability. In some examples, kiosk 105 can be remotely monitored and supported by a remote or central administration entity over a communication network, wherein software updates may be communicated to kiosk 105 and kiosk 105 may communicate relevant information to the remote or central administration entity.

The one or more locks can be engaged using a strike plate, wherein the strike plate controls the locking of the door. For example, a switch can be located on the strike plate and it is the communication between the lock and the switch that controls the locking of the door. The switch can be a magnetic switch, optical switch, pressure switch or any combination thereof or any other suitable switch. The strike plate can be located on the enclosure if the lock is on the door. Alternatively, if the lock is located on the enclosure or side-wall, the strike plate can be located on the door. Additionally, a sensor, or person present sensor, configured to detect the presence of a user can be located on the door or in proximity to the enclosure. The lock can be engaged based on the state of the sensor. For example, the person present sensor can be a proximity sensor. For example, the door includes a computer coupled to the door, wherein the computer can be configured to control unlocking of the door. The lock can be configured to operate independent of the computer controlled unlocking, such that regardless of any signaling from the computer, the enclosure can lock on its own without input from the computer. For example, the computer could continuously send an unlock signal to the lock to keep the lock in an unlocked state, but such a signal can be overridden by the lock being in structural communication with the strike plate structure or by an indication of the sensor. For example, the strike plate can be a magnetic strike plate wherein a magnetic switch is located on the strike plate. For example, the person present sensor can be selected from at least one of an ultrasonic sensor, a motion sensor, a proximity sensor, a pressure sensitive mat, a light curtain, and radar. For example, the lock can be an electrically-actuated lock.

Kiosk 105 can be configured as a product dispensing enclosure comprising: an enclosure, a self locking door coupled to the enclosure, a lock for locking the self-locking door, and a sensor for detecting the presence of a user, wherein the sensor is coupled to the lock. For example, the enclosure can be a cabinet. The cabinet can have at least two, three, four, five or more sides or can be a cylindrical cabinet. For example, the lock can be located on the door. Alternatively, the lock—4—can be located on the enclosure. For example, the enclosure can further include a user authentication mechanism. The user authentication mechanism can be, for example purposes only, a badge reader including an antenna. The badge reader can be an RFID reader or a 2D barcode reader including an antenna for reading an RFID tag or a 2D barcode. For example, the enclosure can include a display screen. The display screen can be a touch display screen configured to provide at least one of access to the enclosure, displaying contents of the enclosure, or additional functionality.

Figure 2A:
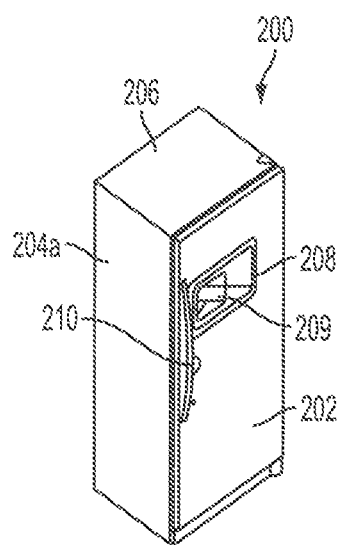
FIGS. 2A-2I illustrates example enclosures of the kiosk, according to the present teachings.
Figure 2B:
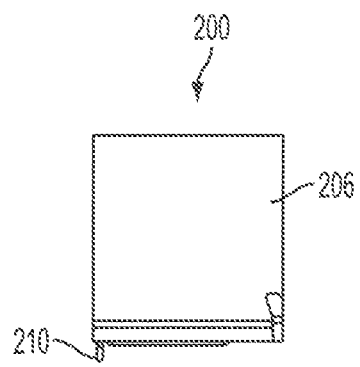
Figure 2C:
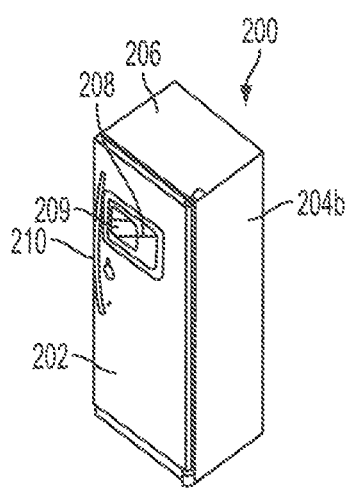
Figure 2D:
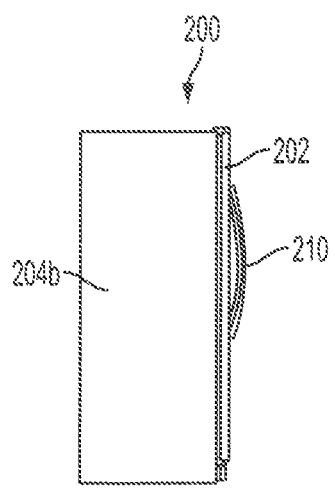
Figure 2E:
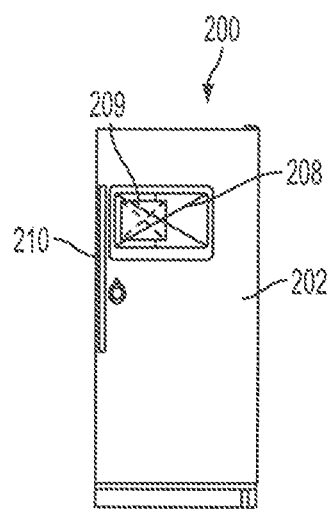
Figure 2F:
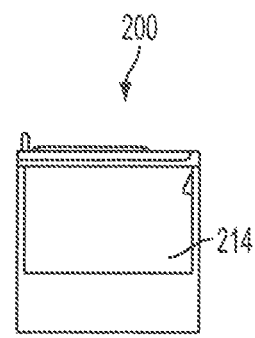
Figure 2G:
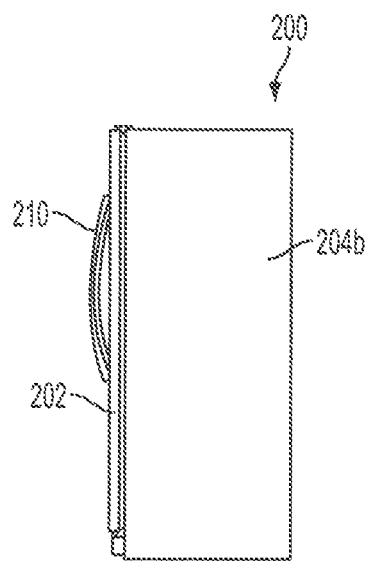
Figure 2H:
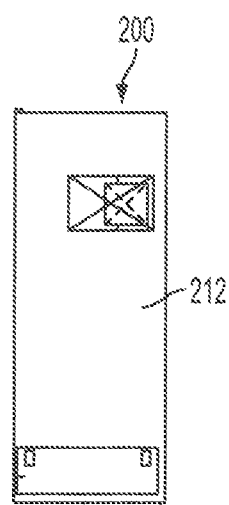
Figure 2I:
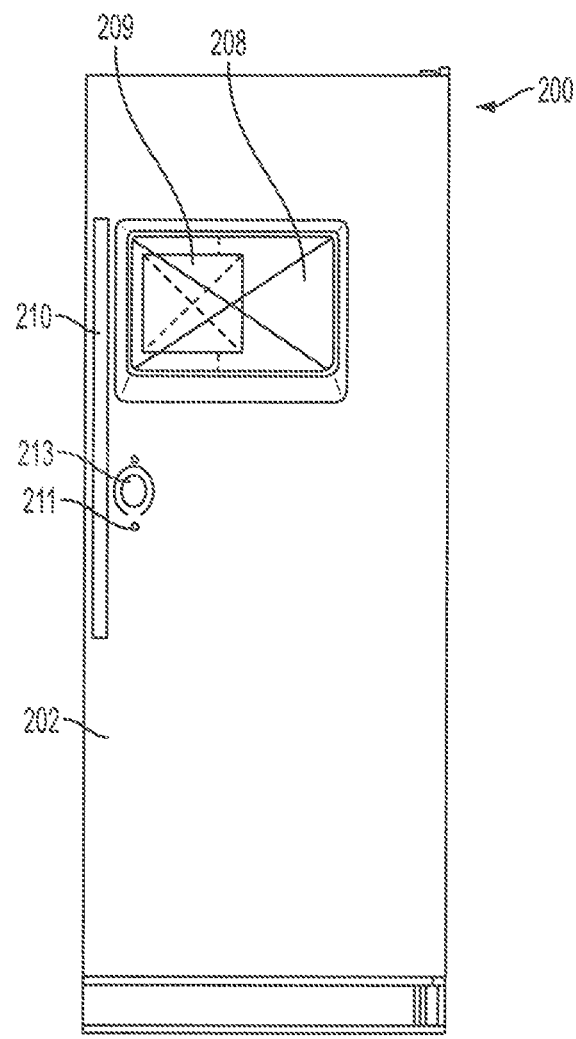

Kiosk 105 can be configured as an enclosure that can be used to store and/or dispense products. The enclosure can be a cabinet with four sides, a top, and a bottom. For example, the cabinet can be cylindrical. For example, at least one of the four sides, the top, or the bottom can be a door. For example, the enclosure is a refrigerator unit or a freezer. For example, there can be more than one door and there can be more than one lock. For example, the enclosure can be a cabinet. FIG. 2A shows a perspective of the enclosure 200. For example, the enclosure 200 can have two sides 204a, 204b, a top 206, bottom, back side, and a door 202. For example, the door 202 can be a half door or a window. For example, the enclosure 200 can be cylindrical. For example, the enclosure can have a door and two sides. For example, the enclosure can have more than two sides, for example, three, four, five, or any other suitable number of sides. For example, the door can include a panel 208 with which the user can interact and can also include a graphical user interface 209. Additionally, a handle 210 can be included on the door 202 of the enclosure 200. FIG. 2B shows the top 206 of an enclosure 205. FIG. 2C shows a perspective view of the enclosure 200 form side 204b. FIG. 2D is a side view of the enclosure 200. FIG. 2E is a front view of the enclosure 200. FIG. 2F is a bottom view of the enclosure. FIG. 2G is a view of the enclosure 200 from the other side. FIG. 2I shows a view of the front door 202 of the enclosure 200. As seen in FIG. 2I, the door can include a panel 208. The panel 208 can have some functionality, including providing communication to an RFID reader located in the door 202 of the enclosure 200. Additionally, the panel 208 can include a touch pad, fingerprint reader, eye scanner, keyboard, or any other suitable authentication mechanism. Additionally, the panel 208 can include a screen 209, such as a GUI. The GUI can enable the user to interact with the cabinet, such as for example, by allowing the user to enter information through a touch screen. For example, the cabinet can include manual lock that is hidden behind a cover 213. For example, an authorized administrator can be able to access by manual lock by removing or moving the lock cover 213. For example, the door 202 can also include a proximity sensor 211.

For example, the enclosure can be used to store products. The products can be tagged with electronic tags, for example, bar codes, RFID tags, magnetic tags, or any other suitable tag. The products can be inventoried manually or automatically by personnel maintaining the enclosure. For example, the products can be inventoried by the enclosure itself. The enclosure can be equipped with an antenna for detecting an electric signal from a tag on a product. For example, there can be more than one antenna. The antenna can be located in the interior of the enclosure. Alternatively, the antenna can be located within the door, such that it isn't directly exposed to the interior of the enclosure and to the interior conditions of the enclosure.

In some cases, products can be inventoried. The products can be inventoried using a tag associated with the product. For example, the product can be tagged with a bar code or an RFID tag. For example, an electronic or magnetic tag can be associated with a product. In some cases, the electronic tag is an RFID tag. The tag can be located on the product itself. To inventory the product, For example, all tags can be scanned or activated or pinged by the antenna. Once a product is removed, the product will no longer be scanned. For example, the tag can be located on a shelf. For example, the tags can be shielded, and only exposed tags can be scanned. For example, the product can be tagged and placed on a metal shelf or some other material which blocks the tag from being read. Once the product is picked up, the antenna can then scan the tag associated with a product and determine which product is being removed from the cabinet. For example, the tag is located on the shelf but the tag is shielded by the product. Once the product is removed from the shelf, the tag is then exposed and can be scanned to inventory the item removed.

The enclosure can have one or more doors. For example, two doors can provide two separate access paths to the interior of the enclosure. For example, a second door can be used to view the interior of the cabinet without accessing the interior of the enclosure. For example, where the enclosure is a refrigerator or a freezer, the second door can serve to save energy by maintaining the temperature of the enclosure. The second door can have a defrosting mechanism to prevent frost build up or fog. For example, the second door can be locked. For example, the viewing door can be opened when access is granted, for example on authentication of a valid user. A user could approach the enclosure. The user can decide to preview the contents of the enclosure by opening the outer door. The user can open the outer door and view the contents of the enclosure. If the user decides to obtain something from the enclosure, the user would then shut the outer door and authenticate with the enclosure using, for example, a badge or typing in a key code, so that the outer door engages with the inner door. The outer door can then enable the user to open the door. The inner door can or can not be unlocked. If the inner door is unlocked, it can still be difficult to open. For example, the inner door can be held in place with magnets but there can not be an easy way to open the inner door. Once the inner and outer doors are operable as a single unit, the opening of the outer door can facilitate the opening of the inner door. For example, the inner door is locked and unlocks with when the user authenticates and the outer door unlocks the inner door.

For example, the enclosure can be opened using a hidden handle. The handle or other means for manually opening the enclosure door can be rendered inaccessible until a user is authenticated by means of a unique identifier such as an RFID card, magnetic stripe card, biometric ID, or the like. Once authentication has taken place the user is given access to the handle or other means for manually opening the enclosure. Since the door is never locked, it is critical that the outside covering of the enclosure provide no features that a user could grasp and use to open the door when the handle is hidden or inaccessible. For example, the hidden handle of the enclosure may not include any physical features on the exterior of the enclosure that can be used to manually open the enclosure door when the handle is in a hidden state. For example, instead of the hidden handle, alternate mechanisms by which the enclosure can be opened can be used. For example, a manual release lever or switch can be present somewhere on the enclosure. Once the user has finished at the enclosure, the handle can be hidden automatically. Alternatively, the user can indicate to the enclosure that the user no longer needs to access the enclosure, and the handle can be hidden once that indication has been made. For example, the door itself has no handle. Located within the vicinity of the enclosure can be a handle dispenser. The user could provide some kind of code or authentication mechanism to the handle dispenser indicating that the user is an authorized user. The handle dispenser would then dispense the handle. The user would then attach the handle to the door by some mechanism, for example, by suction or magnets or a mechanical structure for attaching the handle to the door. Whatever attachment mechanism is used, the attachment of the handle can be reversible. The handle would then provide the user with a method of opening the door. For example, the door can be locked and the handle can include a key slot for unlocking the door. Alternately the handle can include a key pad or other mechanism for entering a code. The handle could then communicate with a locking mechanism wirelessly. Once the user is done, the user would then disengage the handle from the enclosure and return the handle to the handle dispenser. For example, returning the handle to the dispenser would complete a transaction and permit the cabinet to inventory product.

For example, the cabinet can have openings that allow a user to reach in physical grasp the product that they are interested. For example, the user can remove the product through the openings. For example, the user can manipulate the product to a second door or opening through which the product can be removed. For example, the gating feature which would allow the user to grab a product can be locked in that a hand could not be inserted through the opening. For example, the exit door could be locked. The user may have to authenticate in order to gain access to the interior of the cabinet.

For example, the door can include a programmable lock. For example, the programmable lock is interfaced with a computer wherein the computer controls the code needed to be entered to the lock to enable unlocking. For example, a user can authenticate with the enclosure or can, alternatively, log in to an online portal. In order to access the enclosure, at some point during a transaction, either the online portal or enclosure itself can display a randomly generated code sequence. When the user is ready to access the enclosure, the user can then take the code sequence and enter the code into the lock to unlock the cabinet. With each usage, the computer can change the code so that no two sequential codes are the same.

For example, the enclosure can be locked. The cabinet can be locked using a key lock. For example a user would be given a key for use with the enclosure. An electronic tag, such as an RFID tag, can be affixed to or embedded on the key. A detector located in proximity to the enclosure would be able to read the tag and thereby identify the user. For example, the tag can be associated to a default user account. For example, the enclosure can be locked with an electronic locking system that can be unlocked using a computer in communication with a key pad, key code, electronic badge reader, or any other suitable mechanism for allowing a user to change account information, profile information, or any other suitable information.

For example, the cabinet can remain unlocked. The cabinet can be equipped with an alarm. If an unauthorized used opens the cabinet without authenticating, an alarm can sound. The alarm can be deactivated when the door is closed. For example, an alarm can sound if the door is left open.

For example, the door can be lockable. The door can be locked and unlocked using a manual key. For example, the door can be locked and unlocked using a computer. The door can be unlocked after a user presents a key code, RFID badge, magnetic swipe card, credit card, fingerprint, retinal scan, or any other suitable mechanism for unlocking the door. If an authorized user has presented a suitable mechanism for unlocking the door, the computer can then control the unlocking of the locked door. For example, a code can be entered to unlock the door. For example, this code can remain the same. For example, the code can be a randomly generated number that changes each time a user authenticates such that the same number can not be used twice in a row.

For example, the computer controls the locking of the door. For example, the door locks independently from the computer and is therefore not controlled by the computer. For example, the lock can work on a fixed delay. The computer can send an unlock command to the door lock to unlock the door. At such time, a timer can be initiated by this unlock command so that the lock engages after a fixed time period if the door is not opened. For example, the lock can engage without using a fixed delay. If the door is opened before the fixed time period expires, then the timer can be ignored and the lock can remain in an unlocked state until the door is closed. For example, the timer holds the lock in the open position; however, once the door is closed a strike plate can force the lock to engage regardless of whether the door is closed. For example, the presence of the user is sensed by a sensor on the enclosure during the time interval between when the computer sends the unlock command and the user opens the door. A proximity sensor could be used to sense the presence of the user and hold the lock open until the door is opened. If the user walks away without opening the door, the lock can engage based on the state of the proximity sensor. For example, the enclosure can be positioned on a weight sensor pad or a weight sensor pad can be placed in front of the enclosure. The weight sensor pad can sense whether someone is present in front of the enclosure based on weight. Once the user leaves the weight pad, the sensor notes the absence of the user and causes the lock to engage.

Figure 3:
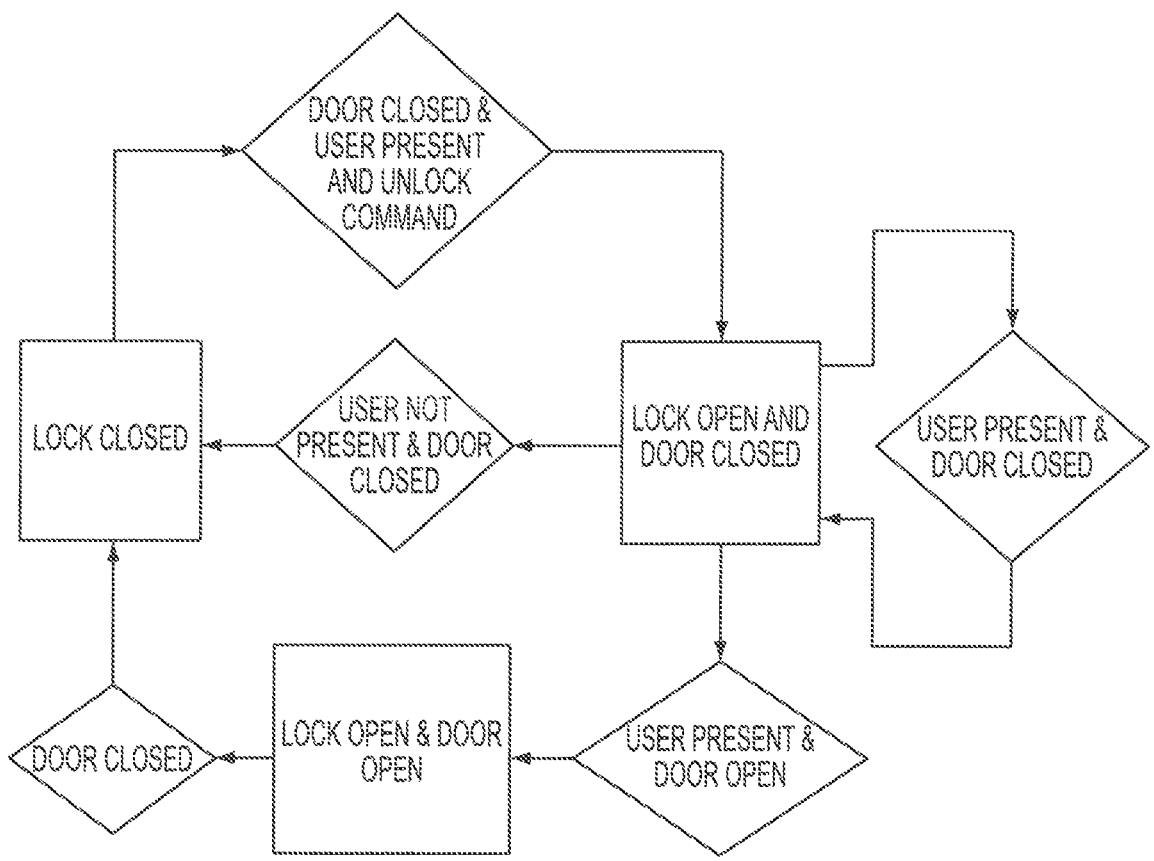
FIG. 3 illustrates an example flow chart of the state of the enclosure, according to the present teachings.

A state flow chart is shown in FIG. 3. For example, the enclosure can have three states. The first state can be a locked closed stage. The door to the enclosure or cabinet is closed and the lock is engaged such that the door cannot be opened. The second state of the cabinet is the lock open but door is closed state. In this state, the computer has issued a command to unlock the door but the door is never opened. A mechanism or circuit in the lock can keep the lock in the opened state. Additionally, a state input can be provided to the lock which input can indicate that the user is at the enclosure, thereby maintaining the lock in an open state. For example, the presence of a user detected by a proximity sensor can send an unlock signal state. The last state of the enclosure is the lock is in an open state and the door has been opened. In this state the user has opened the door.

For example, the cabinet or enclosure can include an electrically-actuated deadbolt lock with a magnetic switch or release mechanism. As long as the requisite voltage is applied to the actuator input the deadbolt is kept in the withdrawn position, unlocking the door. If the voltage is removed while the door is in the closed position, a magnet in the strike plate releases the deadbolt and the door locks. If the door is opened and the voltage subsequently removed, the deadbolt remains in the withdrawn position until the lock mechanism sees the magnet in the strike plate when the door is closed again. Therefore, the lock remains completely independent from computer control. Therefore, a different mechanism can be used to maintain the unlocked state.

For example, a user approaches an enclosure. The detection of the presence of the user by the detector makes the output of the detector go high. If the enclosure door is closed, the door open signal will be low, the output of the inverter will be high, and the output of the AND gate will be high.

Figure 4A:
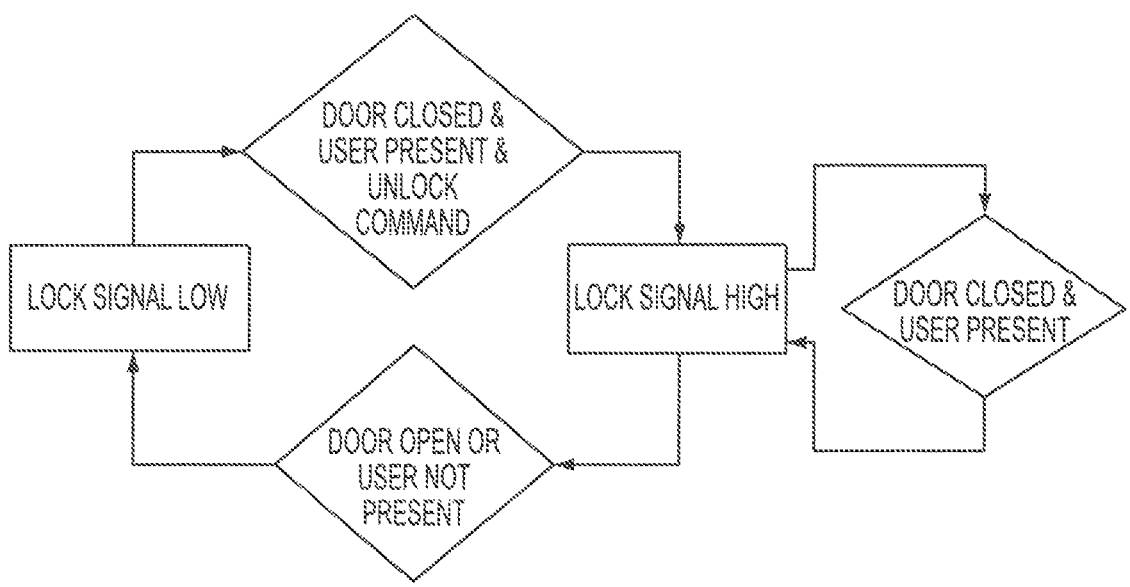
FIG. 4A illustrates another example flow chart of the state of the enclosure, according to the present teachings.
Figure 4B:
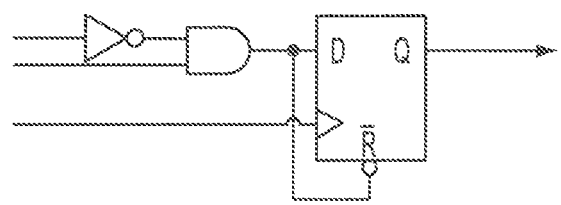
FIG. 4B illustrates an example circuit for controlling the enclosure, according to the present teachings.

When an unlock command is sent from the computer, the high output of the AND gate will be clocked into the flip-flop resulting in voltage being delivered to the lock mechanics which then retracts the dead bolt, unlocking the enclosure. If either the door is opened or the user present detector senses that the user is no longer near the enclosure, the output of the AND gate goes low, resetting the flip-flop which turns off the voltage to the lock mechanics. A flow chart for this is shown in FIG. 4A and a schematic circuit for this approach is shown in FIG. 48.

Figure 5A:
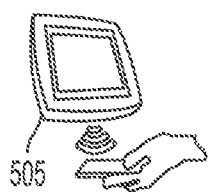
FIG. 5A illustrate an example ordering process, according to the present teachings.
Figure 5A:
Figure 5A:
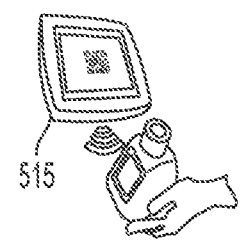
Figure 5A:

FIG. 5A shows an example ordering process, according to the present teachings. At 505, a user scans a badge, with a barcode, with a barcode reader or RFID tag associated with a user interface that is associated with kiosk 105. Alternatively, the user can enter a login identification. Once the badge or login identification has been successfully verified, kiosk 105 unlocks at 510. At 515, the user can remove an item from kiosk 105 and scan the barcode on the item with a barcode reader or RFID tag associated with kiosk 105. Alternatively, the user can manually key in a product code associated with the item if the user is unable to scan the item. A visual indication of the scanned item can be displaced on a display of the user interface of kiosk 105. At 520, the user can confirm the order on the user interface. For example, an icon can be displayed on the user interface and the user can touch the icon or activate a button associated with the icon to confirm the order.

Figure 5B:
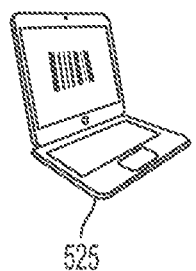
FIG. 5B illustrates another example ordering process, according to the present teachings.
Figure 5B:
Figure 5B:
Figure 5B:
Figure 5B:

FIG. 5B shows an example business-to-business ordering process, according to the present teachings. At 525, a user can log onto a website associated with kiosk 105 and place an order. At the kiosk site, the same user or another user on behalf of which the order was made, can scan a badge at a barcode reader or RFID tag associated with kiosk 105 to verify the identity of the user at 530. At 535, the user can scan a barcode or RFID tag on a receipt or order confirmation that may be printed at the time of ordering. If the scan or the receipt or order confirmation is successful, kiosk 105 can unlock at 540. The user can complete the order (unlock doors) using an user-interface associated with kiosk 105 at 545.

Figure 6:
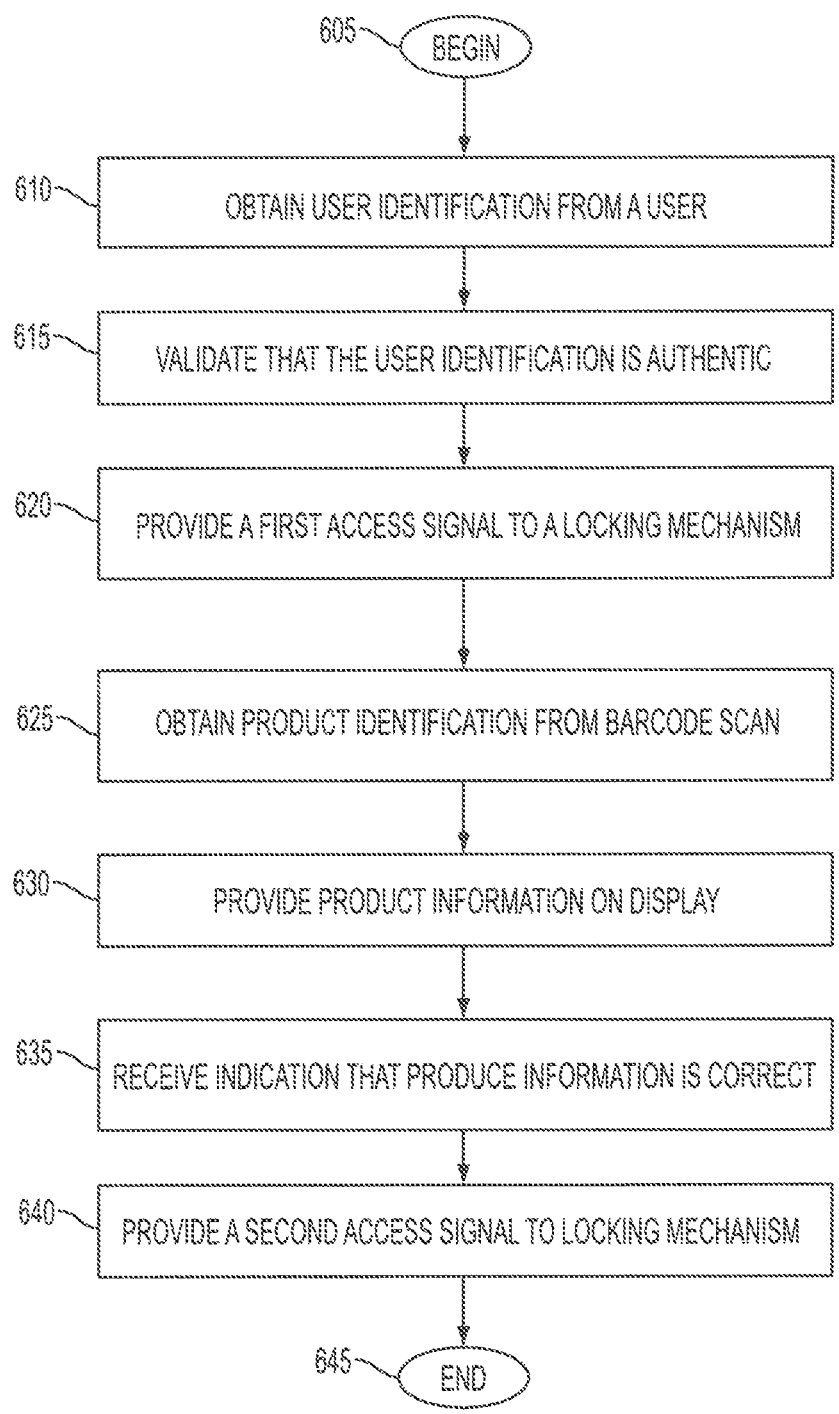
FIG. 6 illustrates another example ordering process, according to the present teachings.

FIG. 6 is an example computer-implemented method for product management in accordance with the present teachings. The method begins at 600. At 605, user identification information can be obtained from a user. The identification code can be associated with a financial account of the user. For example, the user identification information can be obtained from the user by scanning a badge comprising a barcode that has been registered with the user, using an RFID tag, and/or entering a user identification information. At 610, the identification information can be validated as authentic, by a processor, based on registration information that was previously received. At 615, a first access signal can be provided to a locking mechanism of a locking enclosure to unlock the locking mechanism based on the validating, wherein the locking enclosure securely stores a purchasable product. At 620, product identification information can be obtained from a scan of a bar code or a universal product code ("UPC") associated with the product, a RFID tag, or by manual entry of a product identification. For example, the barcode or UPC can be a 1-D, 2-D, or an n-dimensional barcode. The product identification information can be obtained from the scan of the bar code associated with the product by scanning the barcode with a barcode reader or using a RFID tag.

At 625, the product information that was obtained can be provided to be rendered on a display. At 630, an indication can be received from the user that the product information is correct. The product information can be collected once the product information has been identified as being correct. The product information that was collected can be provided to an inventory and/or fulfillment system to be used for product analysis and/or resupply for the locking enclosure. At 635, a second access signal can be provided to the locking mechanism to lock the locking mechanism based on the indication that was received. At 640, the process can end.

Figure 7:
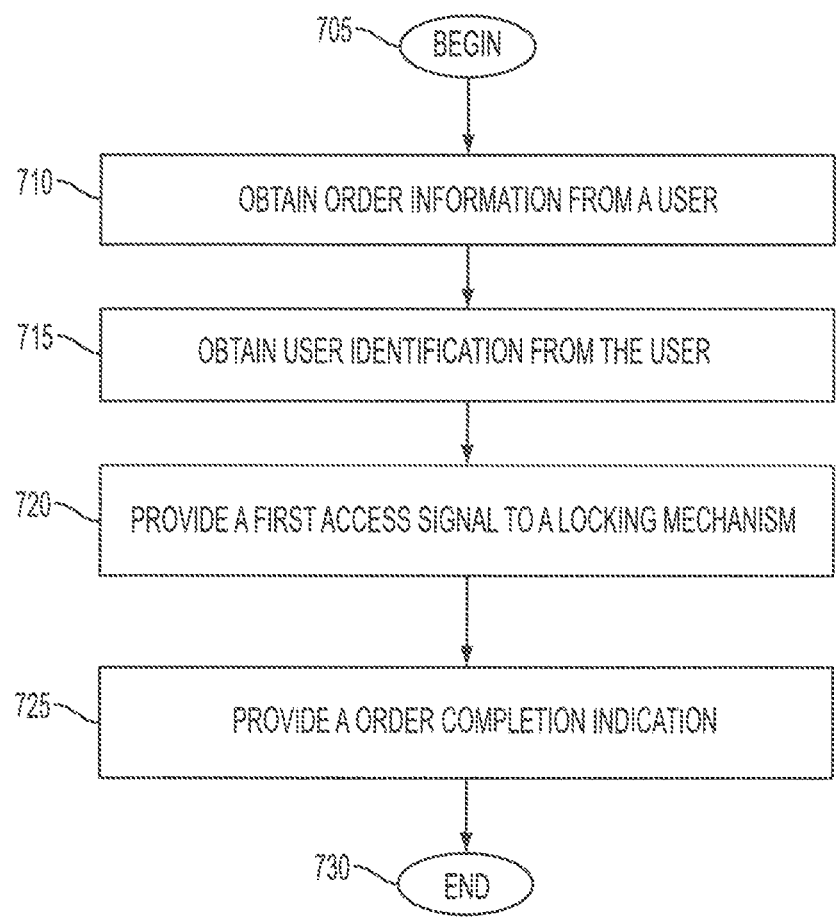
FIG. 7 illustrates another example ordering process, according to the present teachings.

FIG. 7 shows an example computer-implemented method for product management in accordance with the present teachings. The method can begin at 705. At 710, order information can be obtained for a user. The order information can comprise one or more of: information related to the user, information related to one or products that the user wishes to purchase in an order. The order information can be obtained using, for example, a bar code or an RFID tag.

At 715, user identification information can be obtained from a user using, for example, a bar code or an RFID tag. The identification code can be associated with a financial account of the user. The user identification information can be validated as authentic, by a processor, based on registration information that was previously received. At 720, order confirmation information can be obtained from a scan of a bar code associated with the order confirmation or through an RFID tag. At 725, a first access signal can be provided to a locking mechanism of a locking enclosure to unlock the locking mechanism based on the order confirmation information that was obtained. Product identification information can be obtained from a scan of a bar code, an RFID tag, or a universal product code ("UPC") associated with the product. For example, the barcode or UPC can be a 1-D, 2-D, or an n-dimensional barcode. The product identification information can be obtained from the scan of the bar code associated with the product by scanning the barcode with a barcode reader. The product information that was obtained can be provided to be rendered on a display for visual confirmation. An indication can be received from the user confirming that the product information is correct.

At 730, an order completion indication can be provided subsequent to the first access signal indicating that the order is complete. A second access signal can be provided to the locking mechanism to lock the locking mechanism based on the indication that was received. The method can end at 735.

Figure 8:
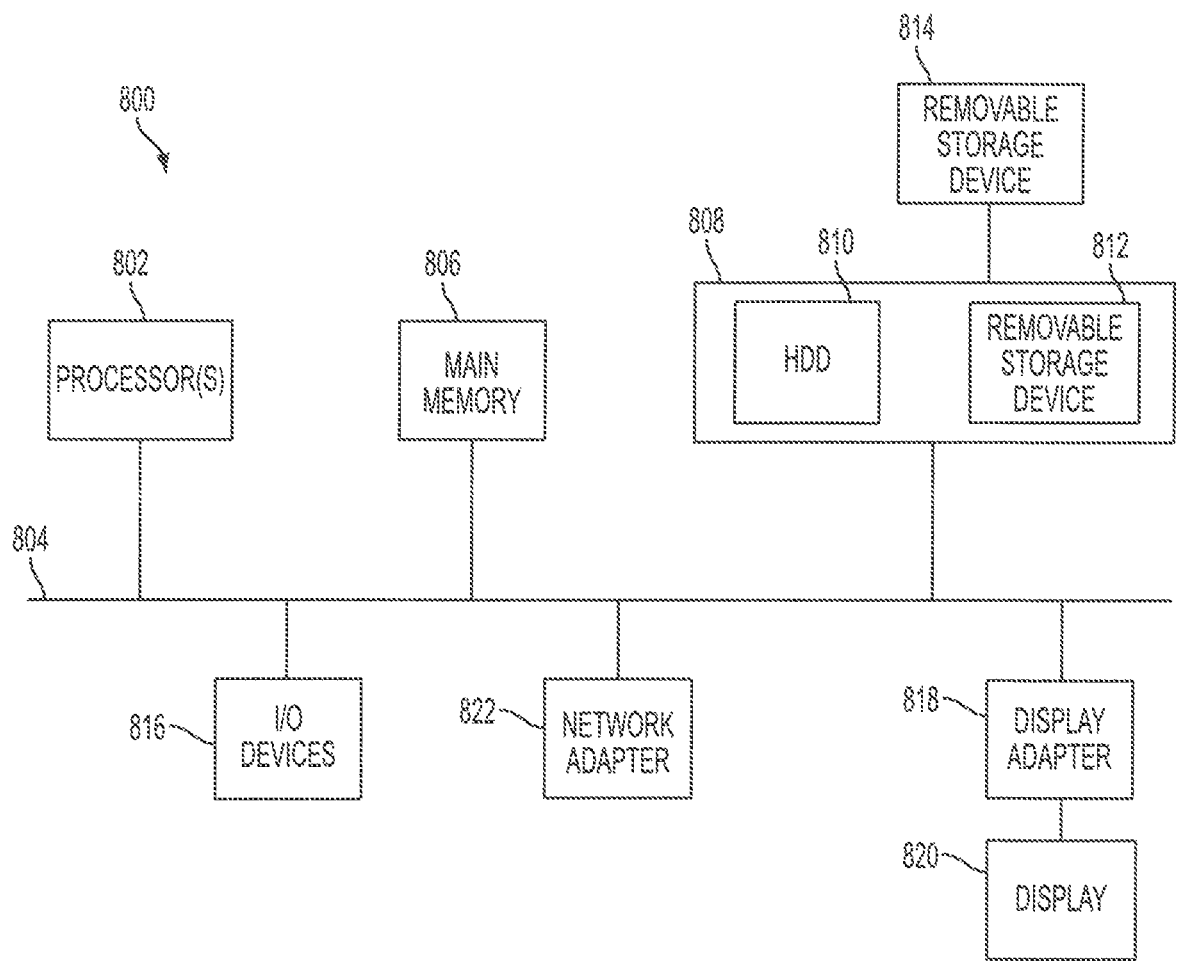
FIG. 8 illustrates an example computer system that can, in part, implement the methods of FIGS. 6 and 7, according to the present teachings.

FIG. 8 illustrates a computer system 700 that is consistent with implementations of the present disclosure to execute, for example, the method of FIGS. 6 and 7. The computer system 800 can be implemented in various computer systems, such as a personal computer, a server, a workstation, an embedded system, a distributed system, a multifunction device, or a combination thereof. The processes described herein can be implemented as a computer program. The computer program can exist in a variety of forms both active and inactive. For example, the computer program can exist as software program(s) comprised of program instructions in source code, object code, executable code or other formats, firmware program(s), or hardware description language (HDL) files. Any of the above can be embodied on a computer readable medium, which include storage devices, in compressed or uncompressed form. Examples of the components that can be included in system 800 will now be described.

As shown, system 800 can include at least one processor 802, input/output devices 816, and may include a keyboard, a pointing device (e.g., a mouse, a touchpad, and the like), a display adapter 819 and display 820, main memory 806, network adapter 822, removable storage device 812, external removable storage device 814, and a storage device 808 including hard disk drive 810 and removable storage device 812. Storage device 808 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. System 800 can also be provided with additional input/output devices, such as a printer (not shown). The various components of system 800 communicate through a system bus 804 or similar architecture. In addition, system 800 can include an operating system (OS) that resides in memory 806 during operation. One skilled in the art will recognize that system 800 can include multiple processors. For example, system 800 can include multiple copies of the same processor. Alternatively, system 800 can include a heterogeneous mix of various types of processors. For example, system 800 can use one processor as a primary processor and other processors as co-processors. For another example, system 800 can include one or more multi-core processors and one or more single core processors. Thus, system 800 can include any number of execution cores across a set of processors. One skilled in the art will also recognize that other components and peripherals can be included in system 800.

Main memory 806 serves as a primary storage area of system 800 and holds data that is actively used by applications running on processor 802. One skilled in the art will recognize that applications are software programs that each contains a set of computer instructions for instructing system 800 to perform a set of specific tasks during runtime, and that the term "applications" can be used interchangeably with application software, application programs, device drivers, and/or programs in accordance with embodiments of the present teachings. Memory 806 can be implemented as a random access memory or other forms of memory as described below, which are well known to those skilled in the art.

OS is an integrated collection of routines and instructions that are responsible for the direct control and management of hardware in system 800 and system operations. Additionally, OS provides a foundation upon which to run application software and device drivers. For example, OS can perform services, such as resource allocation, scheduling, input/output control, and memory management. OS can be predominantly software, but can also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, WINDOWS VISTA, WINDOWS VISTA, WINDOWS 7, and WINDOWS 8), MAC OS, iOS, LINUX (e.g., Arch Linux, Chromium OS, Debian including Ubuntu, Fedora including Red Hat Enterprise Linux, Gentoo, openSUSE, Android, and Slackware), UNIX, ORACLE SOLARIS, OPEN VMS, and IBM AIX.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor (e.g., processor 802), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer-implemented method for product management comprising:

obtaining user identification information from a user at a display associated with a kiosk, the kiosk being configured as a product dispensing enclosure securely storing purchasable products with a locking enclosure thereof that is selectively locked by an associated locking mechanism, wherein the user identification information is associated with a financial account of the user;

validating, by a processor, that the user identification information received at the display associated with the kiosk is authentic based on registration information that was previously received;

providing a first access signal to the locking mechanism of the locking enclosure at the kiosk to unlock the locking mechanism based on the validating, wherein the locking enclosure at the kiosk securely stores a purchasable product;

after providing the first access signal to unlock the locking enclosure of the kiosk storing the purchasable product, obtaining product identification information from a scan of a barcode associated with the purchasable product;

providing the product identification information that was obtained from the scan to be rendered on the display associated with the kiosk;

receiving, at the display associated with the kiosk, an indication from the user that the product identification information is correct;

providing a second access signal to the locking mechanism to lock the locking mechanism based on the indication that was received;

sending the product identification information of the purchasable product that was stored within the locking enclosure of the kiosk to an offsite component comprising an inventory and/or fulfillment system; and automatically requesting, from the offsite component, a resupply of the purchasable product to the kiosk based at least on the product identification information sent to the offsite component.

2. The computer-implemented method according to claim 1, further comprising obtaining order information for a user, wherein the order information comprises one or more of information related to the user or information related to one or more products that the user wishes to purchase in an order.

3. The computer-implemented method according to claim 1, wherein the obtaining user identification information from the user comprises scanning a badge comprising a barcode that has been registered with the user.

4. The computer-implemented method according to claim 3, wherein the barcode is a 1-dimensional barcode or a 2-dimensional barcode.

5. The computer-implemented method according to claim 1, wherein the obtaining product identification information from the scan of the barcode associated with the purchasable product comprises scanning the barcode with a barcode reader.

6. The computer-implemented method according to claim 1, further comprising collecting the product identification information once the product identification information has been identified as being correct.

7. The computer-implemented method according to claim 1, further comprising:
scanning an electronic or magnetic tag associated with each of a plurality of products within the locking enclosure;
determining an inventory of each of the plurality of products based on the scanned electronic or magnetic tag.

8. A computer-implemented method for product management comprising:
obtaining order information for a user, wherein the order information comprises one or more products that the user wishes to purchase in an order;
obtaining user identification information from the user, wherein the user identification information is associated with a financial account of the user;
obtaining order confirmation information at a kiosk configured as a product dispensing enclosure securely storing one or more products in the order within a locking enclosure thereof that is selectively locked by an associated locking mechanism, the order confirmation information being obtained at the kiosk from a scan of a barcode associated with an order confirmation;
providing a first access signal to locking mechanism of the locking enclosure at the kiosk storing the one or more products in the order to unlock the locking mechanism based on the order confirmation information that was obtained;
providing an order completion indication on a display at the kiosk subsequent to the first access signal indicating that the order is complete;
sending the order confirmation information of the one or more products in the order that were stored within the locking enclosure of the kiosk to an offsite component; and
automatically requesting, from the offsite component, a resupply of the one or more products in the order to the kiosk based at least on the order confirmation information.

9. The computer-implemented method according to claim 8, further comprising validating, by a processor, that the user identification information is authentic based on registration information that was previously received.

10. The computer-implemented method according to claim 8, further comprising obtaining product identification information from a scan of a barcode associated with the one or more products.

11. The computer-implemented method according to claim 8, further comprising providing the product identification information that was obtained to be rendered on the display associated with the kiosk.

12. The computer-implemented method according to claim 8, further comprising receiving, at the display associated with the kiosk, an indication from the user that the product identification information is correct.

13. The computer-implemented method according to claim 12, further comprising providing a second access signal to the locking mechanism to lock the locking mechanism based on the indication that was received.

14. A kiosk configured as a product dispensing enclosure, comprising:
a locking enclosure having a locking mechanism configured to selectively lock the locking enclosure;
a display, and
a computer system associated with the locking enclosure and in communication with the locking mechanism and the display, the computer system comprising at least one processor and a memory containing instructions for execution by the at least one processor, such that the instructions, when executed by the at least one processor, cause the computer system to perform a method for product management, the method comprising:
obtaining user identification information from a user at the display, wherein the user identification information is associated with a financial account of the user;
validating, by the at least one processor, that the user identification information received at the display is authentic based on registration information that was previously received;
providing a first access signal to the locking mechanism of the locking enclosure to unlock the locking mechanism based on the validating, wherein the locking enclosure securely stores a purchasable product;
after providing the first access signal to unlock the locking enclosure obtaining product identification information from a scan of a bar code associated with the purchasable product;
providing the product identification information that was obtained from the scan to b e rendered on the display;
receiving, at die display, an indication from the user that the product identification information is correct;
providing a second access signal to the locking mechanism to lock the locking mechanism based on the indication that was received;
sending the product identification information of the purchasable product that was stored within the locking enclosure to an offsite component comprising an inventory and/or fulfillment system; and
automatically requesting, from the offsite component, a resupply of the purchasable product to the device based at least on the product identification information sent to the offsite component.

15. The device according to claim 14, wherein the instructions, when executed by the at least one processor, further cause the computer system to perform the method comprising obtaining order information for the user, wherein the order information comprises one or more of: information related to the user or information related to one or products that the user wishes to purchase in an order.

16. The device according to claim 14, further comprising a barcode reader in communication with the computer system, wherein the obtaining user identification information from the user comprises scanning, using the barcode reader, a badge comprising a barcode that has been registered with the user.

17. The device according to claim 14, wherein the instructions, when executed by the at least one processor, further cause the computer system to perform the method comprising collecting the product identification information once the product identification information has been identified as being correct.

18. The device according to claim 17, wherein the instructions, when executed by the at least one processor, further cause the computer system to perform the method comprising:
scanning an electronic or magnetic tag associated with each of a plurality of products within the locking enclosure; and
determining an inventory of each of the plurality of products based on the scanned electronic or magnetic tag.

19. A kiosk for product management, comprising:
a locking enclosure for securely storing a purchasable product, the locking enclosure having a locking mechanism; and
a computer system associated with, and in communication with, the locking enclosure, the computer system comprising at least one processor and a memory containing instructions for execution by the at least one processor, such that the instructions cause the computer system to perform a method for product management, the method comprising:
obtaining user identification information from a user, wherein the user identification information is associated with a financial account of the user;
validating, by the at least one processor, that the user identification information is authentic based on registration information that was previously received;
providing one or more access signals to the locking mechanism to operably control a locking state of the locking mechanism, thereby selectively permitting validated user access to the locking enclosure;
identifying a maintenance issue associated with the kiosk; and
sending a maintenance request to an offsite component based on the identified maintenance issue.

\* \* \* \* \*